United States Patent [19]

Dir et al.

[11] Patent Number: 4,767,190

[45] Date of Patent: Aug. 30, 1988

[54] TRANSIENT STATE LIQUID CRYSTAL IMAGE BAR WITH CONTRAST ENHANCEMENT

[75] Inventors: Gary A. Dir, Fairport; Alain E. Perregaux, Pittsford, both of N.Y.

[73] Assignee: Xerox Corporation, Stamford, Conn.

[21] Appl. No.: 937,806

[22] Filed: Dec. 4, 1986

[51] Int. Cl.[4] .............................................. G02F 1/13
[52] U.S. Cl. ........................... 350/339 R; 350/331 R; 350/334
[58] Field of Search ............... 350/339 R, 346, 347 E, 350/331 R, 334, 347 R

[56] References Cited

U.S. PATENT DOCUMENTS

| | | | |
|---|---|---|---|
| 3,784,280 | 1/1974 | Bigelow | 350/150 |
| 3,863,246 | 1/1975 | Trcka | 340/324 R |
| 3,900,248 | 8/1975 | Nagasaki | 350/347 R |
| 3,912,369 | 10/1975 | Kashnow | 350/347 R |
| 4,019,808 | 4/1977 | Scheffer | 350/347 R |
| 4,212,048 | 7/1980 | Castleberry | 362/19 |
| 4,408,839 | 10/1983 | Wiener-Avnear | 350/347 R |
| 4,497,542 | 2/1985 | Kaye | 350/335 |
| 4,595,259 | 6/1986 | Perregaux | 350/331 R |
| 4,701,028 | 10/1987 | Clerc et al. | 350/347 E X |

OTHER PUBLICATIONS

"Performance of a Matrix Display Using Surface Mode;" J. L. Fergason; 1980 Biennial Display Research Conference; pp. 177-179, 1980 IEEE.

Primary Examiner—Stanley D. Miller
Assistant Examiner—Richard F. Gallivan
Attorney, Agent, or Firm—Robert A. Chittum

[57] ABSTRACT

An improved transient state liquid crystal image bar having enhanced contrast with lower required driving voltage. The image bar is of the type having a nematic liquid crystal cell configured as a single array of dot shutters energizable by a single freqency voltage with crossed polarizer and analyzer. The polarizing axis of the polarizer is at 45 degrees with the liquid crystal molecules in their rest state. Thus, when all the image bar shutters are energized, it is in the non-transmission condition. For bursts of light to pass, the voltage to selected dot shutters are interrupted and reapplied. In one embodiment, the improvement is achieved by an optical compensator or thin prism placed between the polarizer and the liquid crystal cell. In another embodiment, a quarterwave plate is placed between the liquid crystal cell and the analyzer, with the analyzer being rotated about the image bar's optical axis a predetermined angle from its initial crossed position with respect to the polarizer, so that there is increased extinction of the light exiting from the liquid crystal cell, when the liquid crystal material is in its normally stable energized state.

6 Claims, 4 Drawing Sheets

TRANSIENT STATE LIQUID CRYSTAL IMAGE BAR WITH CONTRAST ENHANCEMENT

BACKGROUND OF THE INVENTION

1. Field of the Invention

The present invention relates to liquid crystal image bars for electrophotographic printers and, more particularly, to transmissive nematic image bars in which all electrodes are normally energized for nontransmission of light therethrough and which selectively pass bursts of light for erasure of precharged regions on a moving photoconductive member of the printer during the transient state. This transient state is caused by the interruption and reapplication of a voltage to selected electrodes.

2. Description of the Prior Art

This invention is an improvement over U.S. Pat. No. 4,595,259 to Perregaux, granted June 17, 1986. In this patent, crossed polarizers are used on either side of a nematic liquid crystal device to prevent the passage of light in the electrically driven state. The liquid crystal device is configured as a single array of dot shutters and is driven by a single frequency voltage source. A nematic liquid crystal material having a positive dielectric anisotropy is used. The electrically driven stable state of the liquid crystal material would permit the transmission of light except for the crossed polarizers. When selective ones of the dot shutters are to transmit light, the electric field across the electrodes forming the dot shutters is interrupted. Within one millisecond after field interruption, about 90 percent of the transmissable light passes through the selected dot shutters. The first transmission maximum occurs and diminishes to about 90 percent of the transmissable light after two or three milliseconds, but in all cases where speed is critical, the transmission burst can be interrupted before it has reached its maximum through reapplication of the electric field and still provide enough energy to form one line of a latent electrostatic image on a moving photoconductive member. Once the field has been reapplied and the system brought back to its dark state, if a second succeeding line of latent image requires the passage of light from the same dot shutter, the voltage to the electrodes is interrupted again to pass another beam of light. The energized time period for rendering the image bar non-transmissive between any two bursts of light is so short relative to the movement of the photoconductive member that there is no undischarged space between succeeding adjacent spots or pixels. Therefore, high quality latent images are produced. Such an arrangement provides a liquid crystal dot shutter type image bar suitable for use in an electrophotographic printer, wherein the photoconductive member moves at a speed of typically two inches per second. This arrangement is relatively independent of temperature and gap thickness, so that it is very cost effective and suitable for low cost printers.

However, the image bar disclosed in U.S. Pat. No. 4,595,259 exhibits limited contrast at low voltage primarily because of the incomplete tilt of the liquid crystal molecules in their energized state mostly in the direct vicinity of the substrate surface. That is, the molecules are not perfectly parallel to the electric field or perpendicular to the glass substrates which sandwich the liquid crystal material. As a consequence, the linearly polarized light entering the device comes out of it elliptically polarized and is incompletely absorbed by the second crossed polarizer. None of the prior art discusses or solves this problem.

U.S. Pat. No. 4,497,542 to Kaye discloses the use of two parallel stacked liquid crystal cells, whereby a beam of light passing through one of the cells in a direction normal thereto passes through both cells. The pair of cells are positioned between a pair of polarizers and one is rotated 180 degrees relative to the other about an axis normal to the cells. The liquid crystal molecules of the cells tilt in opposite directions. This has the effect of compensating for a lack of beam collimation. The patent to Kaye addresses the same type of problem as the subject invention, but solves it in a totally different manner. Kaye proposes to compensate for the imperfection of one sign in one device with the imperfection of the opposite sign in a second device of the same type. No attempt is made to use standard optical retarders with which the amount of compensation can be adjusted.

U.S. Pat. No. 4,408,839 to Wiener-Avnear discloses a twisted nematic liquid crystal light valve which compensates for residual birefringence. Impinging light passes through two separate liquid crystal layers having their optical axes twisted oppositely along an axis parallel to the direction of light propagation and aligned perpendicular to one another at the interface between the two liquid crystal layers. The light beam becomes elliptically polarized as it passes through the first liquid crystal layer. The light beam polarization is then transformed from an ellipse to a straight line as the beam traverses through the second liquid crystal layer. In this patent, the imperfection of a right-handed twisted device is compensated with the imperfection of an identical device that has a left-handed twist. As in the patent to Kaye, no attempt is made to use standard optical retarders.

U.S. Pat. No. 4,212,048 to Castleberry discloses the use of a rear illumination prism containing a polarizer to improve the contrast of a dye loaded liquid crystal display device in the reflection mode. It basically suppresses the portion of the light that is polarized in the undesirable direction. In another embodiment of this invention, a prism is used only to redirect a narrow pencil of light in one specific direction without acting on its state of polarization.

U.S. Pat. No. 4,019,808 to Scheffer discloses the use of a birefringent retarder to turn a normally black and white twisted nematic display device into a two color device. In essence, the grey level contrast is replaced by a color contrast. No attempt is made to compensate for any imperfect tilt of the liquid crystal molecules inside the liquid crystal device. On the contrary, the present invention proposes to correct for this imperfect tilt, and improve the grey level contrast without converting it to a color contrast.

U.S. Pat. No. 3,912,369 to Kashnow discloses a liquid crystal display having a polarizer, a liquid crystal cell, a quarter-wave plate, and a reflector. In different embodiments, negative and positive dielectric anisotropy liquid crystal materials are utilized. The main purpose of this patent is to retain the improved contrast of wave rotation provided by a regular twisted nematic device while eliminating a polarizer by placing it between a polarizer and a quarter-wave plate, instead of placing it between two polarizers, as is used in most cases. However, no attempt is made to improve a two polarizer system with an added optical retarder.

U.S. Pat. No. 3,900,248 to Nagasaki discloses a dye loaded liquid crystal device which without polarizers would have a very low contrast of roughly two. Instead of adding a polarizer, this patent adds an optical retarder to rotate the polarization after it has gone through the liquid crystal device to improve the contrast either in the reflected beam or in the transmitted beam intended to go through a second liquid crystal device. It does not address the problem of the remanent ellipticity in a two polarizer system.

U.S. Pat. No. 3,863,246 to Trcka et al discloses a method of lighting a display from the back without the interference of direct light rays. This backlighting scheme reduces bright spot characteristics through the use of a louvered material and a prism, wherein the prism is used to direct light to a display. The main purpose of this invention is to provide the exit side of the device (viewing side) with the appearance of a diffused illumination. To the contrary, the prism of the present invention is used to direct a narrow pencil of light in one specific direction.

U.S. Pat. No. 3,784,280 to Bigelow discloses a reflective liquid crystal display with a light-dark contrasting image by employing a liquid crystal cell containing a nematic liquid crystal composition of a positive dielectric anisotropy and mutually parallel molecular alignment at opposing planar surfaces of the cell. An optical polarizer is positioned on one side of the liquid crystal cell and an optically reflecting member is positioned on the other side of the cell. Unpolarized light incident on the optical polarizer is polarized at a 45 degree angle before entering the liquid crystal cell. The thickness of the liquid crystal cell is adjusted to provide a quarter-wave length relative retardation of the polarized light entering the liquid crystal cell at a 45 degree angle. The light exiting the liquid crystal cell is circularly polarized and after reflection from the optical reflecting member, reenters the liquid crystal cell with the sense of rotation reversed by the reflecting member. The polarization of the light exiting the liquid crystal cell is crossed with respect to the polarization of the polarizer and hence there is complete extinction and a resulting dark surface appearing on the polarizer.

A light region is produced from the liquid crystal display by changing the molecular orientation of the liquid crystal composition such that the alignment of the molecules is in a direction substantially orthogonal to the opposing surfaces of the planar cell walls. Under these conditions, the polarized light exiting from the polarizer passes through the liquid crystal cells and is reflected back through the cell with no polar rotation so that a light region is produced at the viewing surface of the polarizer. By providing means to controllably alter the molecular alignment of the liquid crystal composition in selected regions, light-dark contrasting images are readily displayed at the viewing surface of the polarizer. Here, the liquid crystal device itself is used as an electrically switchable optical quarter-wave retarder. It has nothing to do with the addition of a retarder to a two polarizer system for the sole purpose of boosting the contrast.

SUMMARY OF THE INVENTION

It is an object of the present invention to boost contrast of a liquid crystal image bar by optical means and to allow the device to be operated at lower voltages.

It is another object of the invention to increase the operating longevity of the liquid crystal image bar and to enable a lower cost for its associated electronic package.

It is still another object of this invention to increase the contrast of a liquid crystal image bar by a well chosen optical compensator or retardation plate placed between the image bar and the analyzer to convert elliptically polarized light into linearly polarized light so that it may be more fully blocked by the analyzer or polarizer.

It is yet another object of this invention to achieve increased contrast enhancement of a liquid crystal image bar and to decrease its driving voltage requirement by the use of a quarter-wave plate inserted after the liquid crystal cell of the image bar and before the analyzer. The quarter-wave plate converts any elliptically polarized light exiting from the cell back to linearly polarized light. The analyzer may be rotated to achieve maximum extinction.

The foregoing objects are achieved in the present invention wherein a retardation plate or optical compensator such as a thin prism is placed between a liquid crystal image bar such as, for example, that disclosed above in U.S. Pat. No. 4,595,259 to Perregaux and the analyzer or lower polarizer to convert any elliptically polarized light into linearly polarized light, thus allowing all of the light to be blocked by the analyzer. Using this technique one can increase the contrast by a factor of 2 to 3 in the voltage range of 15 to 50 Vrms. This is because the limited contrast exhibited by the liquid crystal image bar in U.S. Pat. No. 4,595,259 at low voltages, is primarily caused by the incomplete tilt of the molecules in their energized state, thus, a small amount of light is passed by the analyzer or lower polarizer.

Alternatively, a quarter-wave plate with its two main axes parallel to the x and y or main axes of liquid crystal image bar does not affect the linearly polarized component passing the first polarizer but transforms the circularly polarized component exiting from the liquid crystal cell of the image bar into a new linearly polarized component oriented at 45 degrees with respect to the x and y axes. The combination of these two linearly polarized light components enter the analyzer or lower polarizer as a linearly polarized light beam having an orientation slightly tilted with respect to the polarizing axis of the upper polarizer so that extinction of the polarized light exiting from the quarter-wave plate is much higher if the polarizing axes of the analyzer is rotated as required to be parallel with that of the polarized light exiting from the image bar.

A more complete understanding of the present invention can be obtained by considering the following detailed description in conjunction with the accompanying drawings wherein like index numerals indicate like parts.

DESCRIPTION OF THE PREFERRED EMBODIMENT

Figure 1:
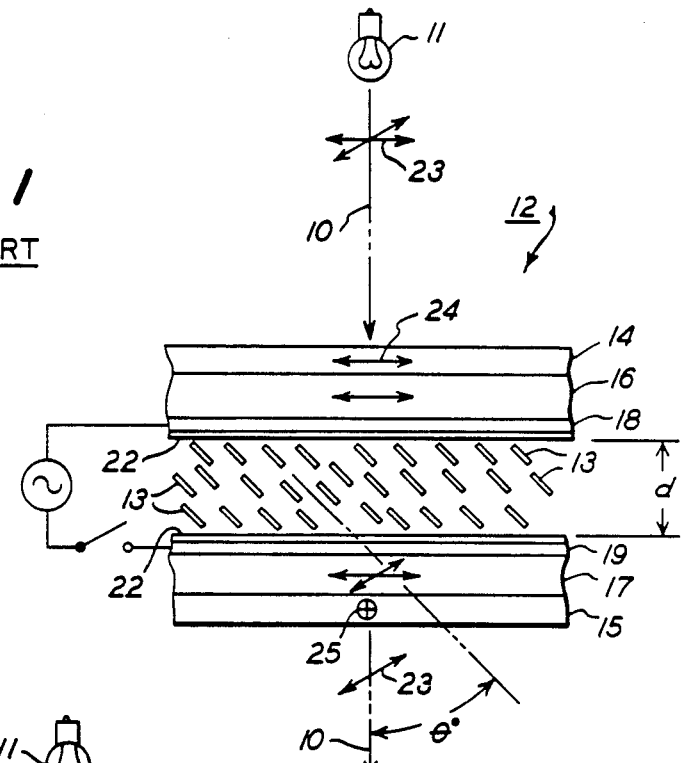
FIG. 1 is a cross-sectional elevation view of a schematic diagram of a liquid crystal image bar as described in U.S. Pat. No. 4,595,259. This prior art figure shows the orientation of the liquid crystal molecules in the transient or transmissive state.

The present invention is an improvement over the transient state liquid crystal image bar disclosed in the above-mentioned U.S. patent to Perregaux. In this patent, incorporated herein by reference, there is disclosed an electrophotographic printer having a series of process stations through which a photoconductive member passes. A latent electrostatic image is formed on the photoconductive member at the imaging station while the photoconductive member passes thereby. The latent electrostatic image proceeds past a development station, a transfer station, a cleaning station, an erasure lamp, and precharging corona generating device prior to returning to the imaging station. The imaging station comprises a light source which illuminates a liquid crystal image bar 12. Light selectively passes through the image bar and is focused by a lens means which may be one or more single lenses, a Selfoc ® (trademark of Nippon Sheet Glass) lens system, a plurality of miniature lenses, or a fiber optic coupler. The image bar selectively passes light to form latent electrostatic images one line at a time by erasing or discharging the image background areas.

The image bar is formed by a single row of dot shutters actuated by selective application of a voltage to the plurality of electrodes on one of the substrates of the image bar. An electronic controller or microcomputer energizes the appropriate electrodes in response to digitized data from, for example, a scanning means such as a charge coupled device or digitized data from a source outside the printer, for example, from a character generator, computer, or other means for storing and retrieving data. The image bar of U.S. Pat. No. 4,595,259, shown in FIG. 1, and the improved image bar of the present invention comprise a transmissive, nematic liquid crystal device 12 having crossed polarizers 14, 15 such as, for example, Polaroid HN 32 polarizers, marketed by the Polaroid Corporation. In the prior art device, these polarizers are attached to each of the outside surfaces of two parallel transparent glass substrates 16, 17. In the present invention, an optical compensator (not shown), thin prism 28 (shown in FIGS. 2 and 4), or quarter-wave plate 26 (shown in FIG. 3) is inserted one of the polarizers and between the liquid crystal cell of the image bar 12, as more fully described later. Transparent electrodes 18, 19 are placed on the inner, confronting surfaces of the glass substrates. A light shield 20, such as that shown in FIG. 3, forms a slit 21 along the center portion of the electrode 18 which runs the length of the liquid crystal image bar 12. A transparent alignment layer 22 covers the electrodes 18, 19 and the light shield. A thin layer of nematic liquid crystal material, such as Merck No. 1132 from the E. Merck Company of Darmstadt, West Germany, is positioned between the glass substrates having the electrodes 18, 19. The liquid crystal material known as E7 or E44 manufactured by the British Drug House (BDH), Poole, England, are also suitable materials for the liquid crystal image bar.

In FIG. 1, the polarizing axes of the two polarizers 14, 15, are positioned on the glass substrates 16, 17 so that they are mutually perpendicular to each other and so that they are at a 45 degree angle with respect to the main axes of the liquid crystal molecules 13 when the molecules are in their relaxed homogeneous state; i.e., when they are lying parallel to the glass substrates. Light depicted as vectors 23 from source 11 enters the material through upper polarizer 14 on glass substrate 16. However, only the light vector parallel to the transmission axis 24 of polarizer 14 enters the liquid crystal material and, because of the orientation of the polarizers with respect to the main axis of the liquid crystal molecules in their relaxed state, the amount of light that is transmitted by the second polarizer 15 is strongly wavelength dependent. In other words, due to birefringence of liquid crystal molecules, the light transmitted by the system in its nonenergized state is made of a complex color mixture. In the electrically driven state, the polarized light is blocked by the second polarizer or analyzer 15 on glass substrate 17 because the transmission axis 25 of polarizer 15 is perpendicular to that of the polarizer 14 and because of the state of polarization of the light, is essentially left unmodified by the liquid crystal molecules regardless of the wavelength.

As a consequence, all areas of the device that are not energizable will transmit a certain amount of stray light which may be damaging to the printing process. For this reason a light shield 20 blocking this stray light must be incorporated into the device. It can be, for example, an opaque metal or organic film deposited on the inner surface of one of the substrates. In the preferred embodiment, light shield 20 is on glass substrate 16. When the electrophotographic printer is placed in the operating mode, all of the electrodes are energized to maintain the liquid crystal molecules in their stable electrically driven state. In the crossed polarizer configuration, this is the non-transmissive state.

As is well known in electrophotography, any position of the photoconductive member which receives light becomes conductive and dissipates surfaces charges thereon. Accordingly, to form a latent electrostatic image, the background regions of the image must be exposed to light. Therefore, when a liquid crystal device is used as an image bar, it is the transmissive state which is used as an erasure state and, accordingly it must be short and well controlled if the latent images are to be produced on a moving photoconductive member by it one line at a time. As discussed in U.S. Pat. No. 4,595,259, this is accomplished by selective interruption and reapplication of the voltage to the electrodes 19 on glass substrate 17. This interruption and reapplication of the voltage to the electrodes 19 cause the liquid crystal molecules to enter a transient state wherein short bursts of light are transmitted through the liquid crystal image bar.

The prior art device of FIG. 1 depicts the liquid crystal molecules 13 as they begin to relax from their electrically driven state, where they are theoretically perpendicular to glass substrates 16, 17, towards their relaxed or rest state, where they are parallel to the glass substrates. During this process, the liquid crystal molecules in this transient state cause the liquid crystal device to go through a succession of maximum and minimum transmission states, as the effective birefringence of the medium goes from 0 to its maximum as a function of molecular orientation (angle $\theta$) shown in FIGS. 1 and 2.

Unlike dual frequency operated liquid crystal devices, the liquid crystal image bar of U.S. Pat. No. 4,595,259 and the present invention is not temperature sensitive in the operating environment of an electrophotographic printer. The gap dimensional tolerances are another important factor in determining manufacturing cost and product yield which further impacts cost. The device of U.S. Pat. No. 4,595,259 and the present invention may have a tolerance up to $\pm 2$ or 3 micrometers for a gap of 12 micrometers because it is relatively gap independent. Additionally, viewing angle is of little consequence because use of an image bar requires only that the photoconductive member view the light transmitted by the image bar from one position, namely, within a small cone angle around 90 degrees of the image bar surface. Without being concerned with a wide viewing cone, the standard 10 micrometer thick device is perfectly acceptable.

Figure 3:
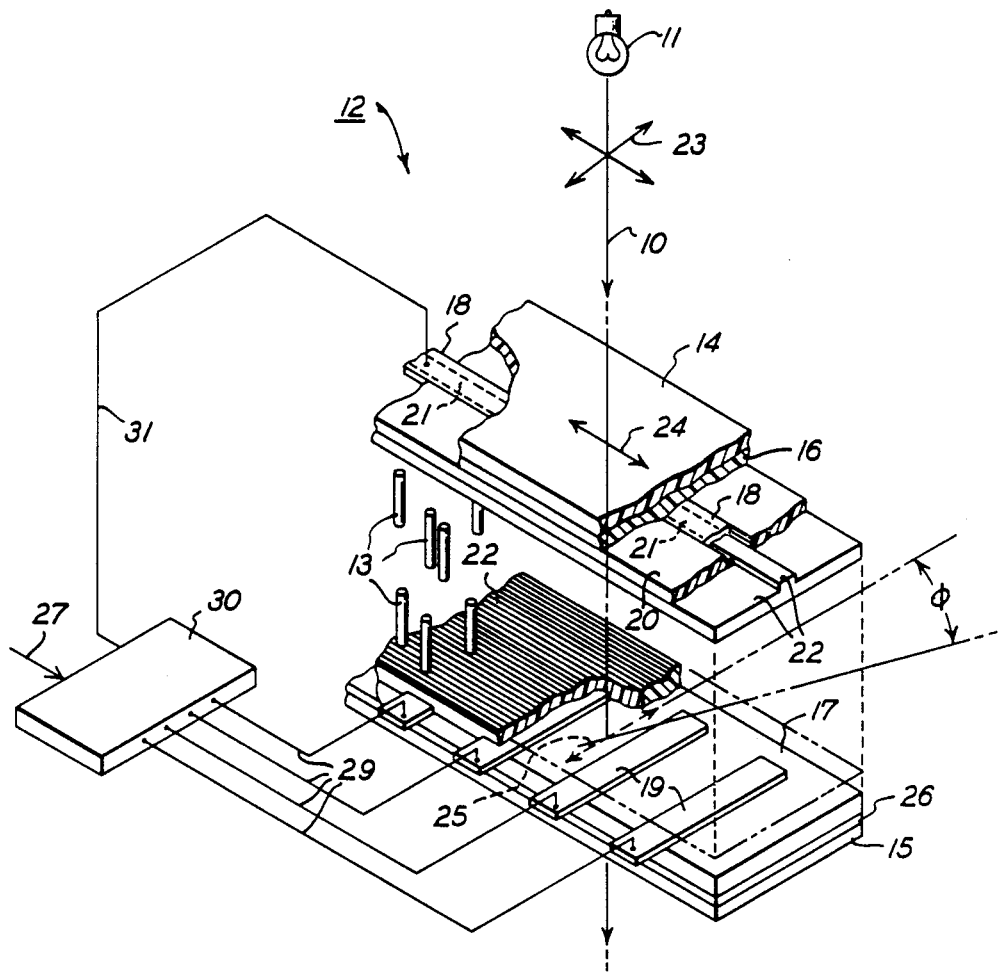
FIG. 3 is an enlarged partially sectioned perspective view of a schematic diagram of a portion of the liquid crystal image bar of the present invention showing the arrangement of electrodes on the transparent glass substrates which form a linear array of dot shutters. The light shield has a slit along the center portion of the transparent electrode on one of the glass substrates, and a quarter-wave plate placed between the liquid crystal cell and the analyzer. The orientation of the liquid crystal molecule is shown in the theoretical fully energized state which places the image bar in a non-transmissive condition.

The limited contrast exhibited by the device described in U.S. Pat. No. 4,595,259 at low voltages is due mostly to the incomplete tilt of the molecules in their actual energized state. Although the liquid crystal molecules shown in FIG. 3 are depicted as being perfectly perpendicular to the glass substrates and parallel to the electric field produced by the electrodes 18, 19, in actuality, these molecules have a slight tilt. As a consequence, the linearly polarized light entering the liquid crystal bar comes out of it elliptically polarized and is incompletely absorbed by the lower polarizer or analyzer, assuming, of course, that the crossed polarizer configuration is used as depicted in FIG. 1. Thus, a well chosen optical compensator or retardation plate placed between the liquid crystal image bar and the analyzer can convert this elliptically polarized light into a linearly polarized light and allow it to be properly blocked by the analyzer when the device is in the fully energized state. The contrast ratio in the transient mode liquid crystal device of U.S. Pat. No. 4,595,259 depends strongly on the light transmission in the electric field driven near homeotropic state. In this mode, as well as in conventional twisted nematics, the molecules do not normally reach full vertical orientation, rather, as stated above, the molecules are at a small to modest angle relative to the substrate normal. Because of the small but finite angle $\alpha$ between the light rays and the long molecular axis (see FIG. 4), the linearly polarized light impinging on the liquid crystal cell exits the cell weakly, elliptically polarized. When an optical compensator is placed in series, either before or after the liquid crystal cell, the light can be returned to the linearly polarized state. This is one embodiment of the present invention and is not shown in the drawings.

Figure 2:
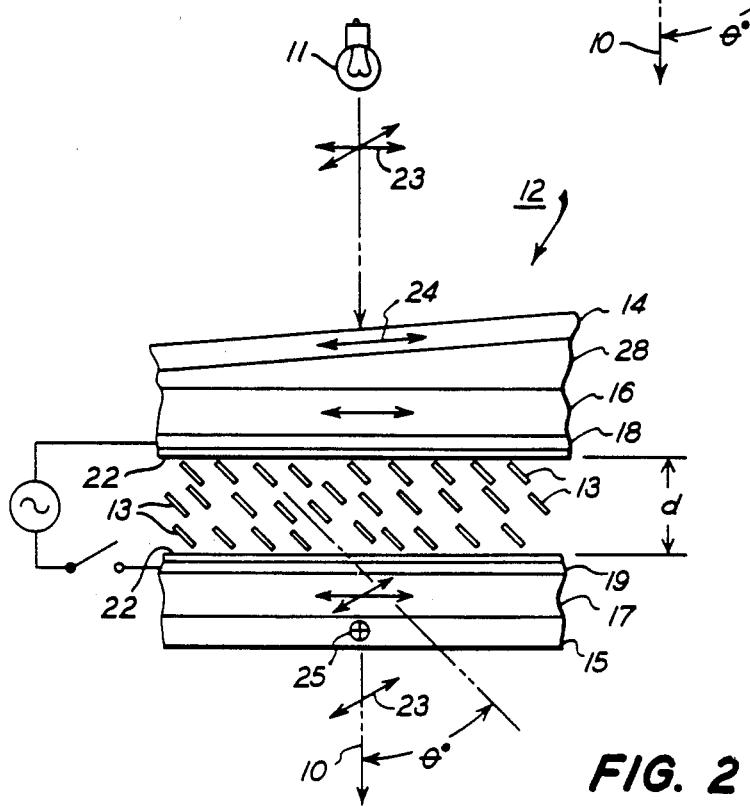
FIG. 2 is a cross-sectional elevation view of a schematic diagram of the liquid crystal image bar of the present invention showing an optical compensator combined with the image and showing the orientation of the liquid crystal molecules in the transient state.
Figure 4:
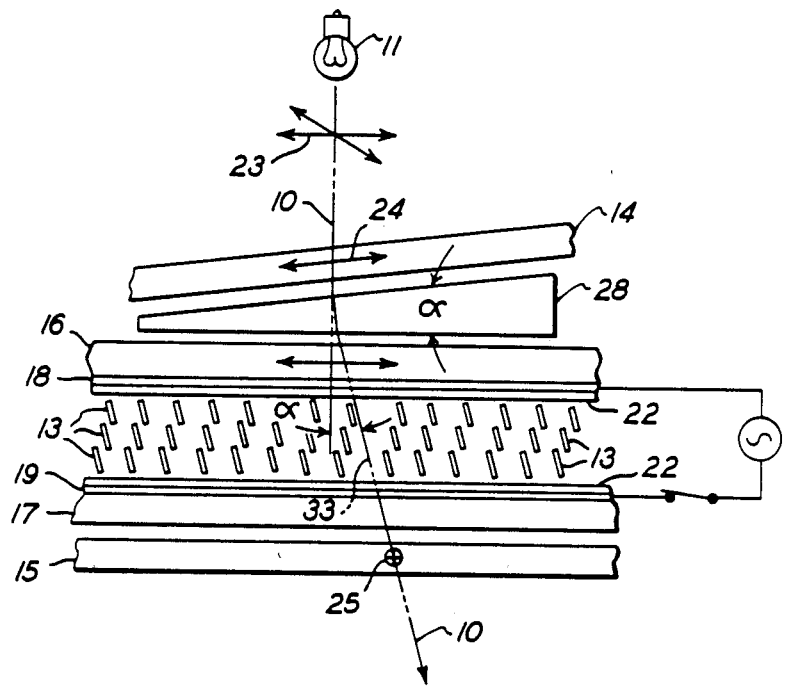
FIG. 4 is the same as FIG. 2, except that the electrodes are all fully energized to produce the non-transmissive state for the image bar, thus showing the liquid crystal molecules in their actual energized state with a slight tilt from vertical.

In a second embodiment of the present invention, shown in FIG. 2, the weakly elliptically polarized light normally passed when the electrodes are all in the fully energized state can be extinguished with a conventional linear polarizer if a thin prismatic optical compensator 28 is used. The addition of the prism has little effect on the light transmission in the normal light transmitting state, that is, the transient state as depicted in FIG. 2. This embodiment is schematically shown in FIG. 4 where the polarizers and thin prism are shown spaced from (exploded view) the liquid crystal cell for clarity and understanding the invention. Light ray 33 is deflected through angle $\alpha$ as it passes through the slightly tilted, energized liquid crystal molecules 13. This angle $\alpha$ must be equal to the prism angle. The situation where the light travels along the original optical axis 10 may be obtained by simply tilting the image bar with the thin prism about the beam; that is, by $\alpha$ degrees. In this manner, the polarized light travels through the liquid crystal material with an orientation that is substantially parallel with the liquid crystal molecules in their energized state. Since the prism is located on the illumination side of the image bar, tolerances are low and consequently so are the costs. In the embodiment where an optical compensator is used instead of a thin prism, a simple plastic sheet (not shown) may be used. Incidentally, only a single light ray is shown in all diagrams for simplicity. In actual practice, however, a cone of rays is actually used where the cone half angle is about 10 degrees. The analogy between a single array and small cone of rays have been checked in experimental setups and the analogy of a single ray has been confirmed. The improvement depicted in the arrangements of FIGS. 2 and 4, achieve the goal of both boosting the contrast of the liquid crystal image bar and permitting the liquid crystal image bar to be operated at lower voltages; thus, the longevity of the device is improved and a cheaper electronic package to drive the image bar is available without sacrifice of contrast.

Figure 5:
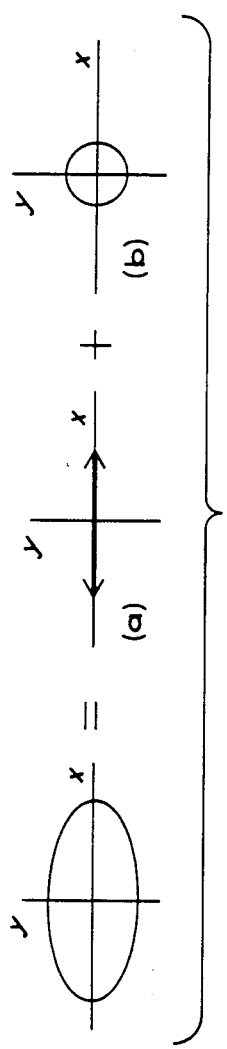
FIG. 5 is a diagrammatic visualization of elliptically polarized light.
Figure 6:
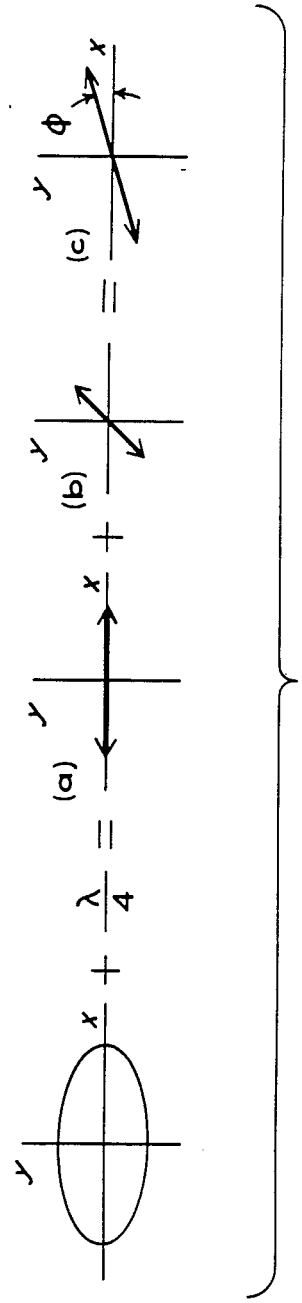
FIG. 6 is a diagrammatic representation of elliptically polarized light and a quarter-wave plate and the resulting orientation of the optical axis of the elliptically polarized light after its passage through the quarter-wave plate.

Referring to FIG. 5, there are several ways of describing elliptically polarized light, one of which visualizes it as a superposition of a linearly polarized beam (a) and a circularly polarized beam (b) in phase with each other. In FIG. 6, a quarter-wave plate with its two main axes parallel to the x and y axes respectively (the main axes of the ellipse), does not affect the linearly polarized component (a) but transforms the circularly polarized component (b) into a new linearly polarized component (b') pointing at 45 degrees between the x and y axes. These two components (a) and (b') in turn recombine as one linearly polarized beam (c), polarized in a direction that is slightly tilted with respect to the original main axis of the ellipse. As a result, if a quarter-wave plate 26 is placed between the liquid crystal cell and analyzer 15 of the image bar described in U.S. Pat. No. 4,595,259 and then the analyzer is rotated by an angle $\Phi$ determined by the detailed property of ellipse, then the extinction is much higher and so is the contrast exhibited by the liquid crystal image bar. This is a preferred, further embodiment of the present invention and is shown in FIG. 3.

FIG. 3 shows schematically the simple electrode configuration for the image bar used in the preferred embodiment. A single, transparent electrode 18 runs the length of the inner surface of glass substrate 16. Light shield 20 covers the inner surface of the glass substrate and overlaps the edges of the electrode 18 so that a slit 21 is centrally formed along the length of the electrode 18. A plurality of transparent parallel electrodes 19 are formed on the inner surface of the lower glass substrate 17. The plurality of electrodes 19 are equally spaced from each other and are perpendicular to electrode 18. The density of the plurality of electrodes are about 10 per millimeter, thus forming one single array of dot shutters to be used as an image bar to produce latent electrostatic images on photoconductive member of an electrophotographic printer. An electronic controller or microcomputer 30 is connected to the electrodes 18, 19, via leads 29; electrode 18 is connected to a fixed reference 0 voltage by the controller via lead 31. The plurality of electrodes 19 are generally connected to a 50 to 60 volt RMS square wave at 5 to 10 kHz until light from source 11 is to be transmitted, whereupon the applied voltage to the desired electrode 19 is interrupted. Light from the source 11 is depicted by light vectors 23 and enters the liquid crystal material along optical axis 10 through polarizer 14. However, only the light vector parallel to the transmission axis 24 of polarizer 14 enters the liquid material and, because the liquid crystal molecules are in their electrically driven state, the polarized light exiting from the liquid crystal cell is blocked by the second polarizer or analyzer 15. The polarizer 15 is able to substantially extinguish the transmittal of light, as explained earlier with respect to FIG. 6, because of the quarter-wave plate 26, coupled with the additional rotation of the analyzer about the optical axis 10 for a further amount of predetermined degrees indicated by the angle $\Phi$.

The improvement principle disclosed with respect to FIGS. 2 and 3 above, were tested with the following examples. In example 1', the liquid crystal material E44 was tested at three different gap thicknesses. The light source was an incandescent lamp filtered through a wide bank Corning 4-69 ® filter and collected from the liquid crystal cell through a 10×/0.25 microscope objective. The results are summarized in the Table below, wherein the time constant $\tau$ is the time the system takes to decay to 90 percent of the maximum light intensity transmitted by the liquid crystal cell.

The fundamental reason why the quarter-wave plate approach boosts the contrast of the liquid crystal image bar described in FIG. 1 by a factor of 8 compared to the factor of 2 to 3 with the compensator or thin prism approach of FIG. 2 has not been investigated. However, both methods pay the same price. That is, the time constant or response time is nearly doubled so that for the increase in contrast there is a speed loss. This speed loss is acceptable for low cost, low speed electrophotographic printers. However, when contrast and low voltage requirements are not mandatory, the recording speed of the liquid crystal image bar may be increased by using the prior art configuration of U.S. Pat. No. 4,595,259.

TABLE

Contrast Enhancement Measurement on a Wedge Cell Filled with the Liquid Crystal Material E44

| Gap μm | Without λ/4 plate | | | With λ/4 plate | | |
|---|---|---|---|---|---|---|
| | Contrast at 50 V | Contrast at 20 V | $\tau$ ms | Analyzer Rotation $\Phi$ | Contrast at 20 V | $\tau$ ms |
| 7.5 | 40 | 12.5 | 0.9 | 15° | 100 | 1.5 |
| 10.0 | 20 | 6.7 | 0.8 | 22° | 60 | 1.5 |
| 12.0 | 17 | 4.8 | 0.8 | 25° | 40 | 1.4 |

Figure 7:
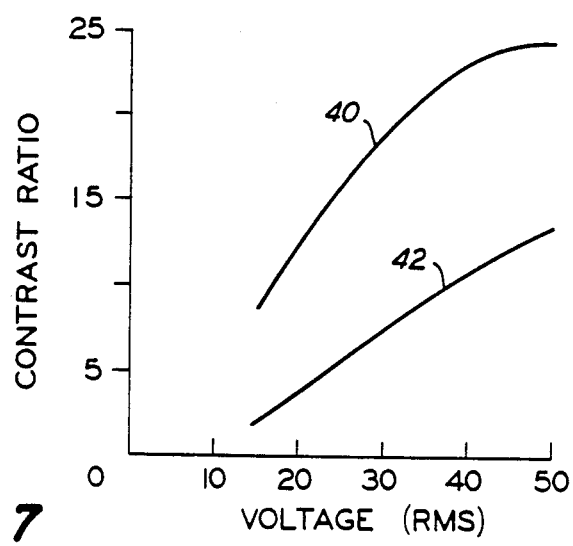
FIG. 7 is a graph showing contrast ratio versus applied voltage for an image bar with and without optical compensation.

In a second example, the light transmission as a function of time was compared between a liquid crystal image bar of the type described in FIG. 1 and the liquid crystal image bar described in FIG. 2. The results are shown in FIG. 7, where contrast ratio versus applied voltage with and without compensation is plotted. Curve 40 shows a contrast ratio versus voltage for the liquid crystal image bar with a compensator, and curve 42 shows a contrast ratio versus voltage for the liquid crystal image bar without a compensator. Therefore, this invention can be viewed as a means for contrast enhancement of a liquid crystal image bar or as a way of reducing the applied voltage at a given contrast ratio.

In summary, the present invention is directed to method and apparatus for improving the contrast of a transient state liquid crystal image bar and for reducing its voltage requirements. A typical liquid crystal image bar for which the present invention applies is one having a nematic liquid crystal cell with crossed polarizers configured as a single array of dot shutters driven by a single frequency voltage source. The image bar produces latent electrostatic images on the printer's photoconductive member one line at a time in response to receipt of digitized data signals. During the operational mode, all of the image bar shutters are energized and in this electrically driven state, the image bar shutters are non-transmissive. The latent image is produced by selective erasure of precharged background areas on the photoconductive member. For the erasure to occur, interruption of the driving voltage to selected shutters in response to data signals cause the selected shutter to become transmissive because the liquid crystal material enters a transient state. The response time for the transmissiveness is about 1 millisecond. Consecutively erased spots by the same shutter requires the momentary reapplication of the driving voltage. Because the function of the image bar is relatively independent of temperature and gap thickness, it is very cost effective. In one embodiment, contrast improvement is obtained by adding an optical compensator or retardation plate to the liquid crystal image bar to align the planar polarization of the light entering or merging from the liquid crystal cell of the image bar for maximum extinction by the analyzing polarizer. Alternatively, a thin prism may be used. In the preferred embodiment, a quarter-wave plate is inserted after the liquid crystal cell of the image bar and before the analyzer. The quarter-wave plate converts any elliptically polarized light exiting from the cell back to linearly polarized light. The analyzer is then rotated about the optical axis of the image bar to achieve maximum extinction by aligning the polarizing axis of the analyzer with linear axis of the elliptically polarized light exiting from the quarter-wave plate. In addition to the increased contrast enhancement, lower driving voltage for the liquid crystal cell may be used allowing multiplexing and reduced electronic costs.

Many modifications and variations are apparent from the foregoing description of the invention, and all such modifications and variations are intended to be within the scope of the present invention.

We claim:

1. An improved transient state liquid crystal image bar for producing latent electrostatic images on a moving, precharged photoconductive member of an electrophotographic printer one line of pixels at a time, the image bar having a nematic liquid crystal cell configured as a single array of dot shutters individually energizable by the selective application of a single frequency driving voltage and having the polarizing axes of the polarizer and analyzer approximately crossed, the polarizing axis of the polarizer being at 45 degress with the liquid crystal molecules in their homogeneous relaxed state, and substantially perpendicular to the optical axis of the image bar, so that the image bar is non-transmissive when all of the dot shutters are energized, bursts of light for erasing pixels of precharged background area of the photoconductive member being passed by selected dot shutters through the interruption and reapplication of the voltage applied thereto, wherein the improvement comprises:

an optical compensating member being placed between the liquid crystal cell and either the polarizer or analyzer, the compensating member being oriented in a predetermined position relative to both the polarizing axis of the polarizer or analyzer and the molecules of the nematic liquid crystal material in their homogeneous non-energized state, so that the elliptically polarized light, generated by the incomplete homeotropic state or tilt of the energized liquid crystal molecules as the linearly polarized light enters and passes therethrough, is prevented from entering the analyzer, whereby the contrast between the transmissive and non-transmissive state of the image bar is increased and the driving voltage is concurrently reduced.

2. The improved image bar of claim 1, wherein the optical compensating member is a relatively thin transparent prism between the polarizer and the liquid crystal cell, the deflection angle of light passing through the prism being matched to the deflection angle of light passing through the liquid crystal molecules in their energized state.

3. The improved image bar of claim 1, wherein the optical compensating member is a quarter-wave plate between the liquid crystal cell and the analyzer; and wherein the polarizing axis of the analyzer is rotated relative to the polarizing axis of the polarizer and the quarter-wave plate for a predetermined number of degrees ($\Phi$) so that the polarizing axis of the analyzer is coincident with the linearly polarized light exiting from the quarter-wave plate.

4. The improved image bar of claim 3, wherein the predetermined number of degrees ($\Phi$) is 25 degrees or less.

5. A transient state liquid crystal image bar for producing latent electrostatic images on a moving, precharged photoconductive member of an electrophotographic printer one line of pixels at a time through the selective passage of bursts of polarized light along an optical axis that is normal thereto, comprising:

a nematic liquid crystal cell configured as a single array of dot shutters individually energizable by the selective application of a single frequency driving voltage, the nematic liquid crystal material contained therein being of the type having its molecules in the homogeneous orientation when in the non-energized or relaxed state;

a polarizer and an analyzer being parallel to each other and having their polarizing axes approximately crossed, the polarizing axis of the polarizer being at 45 degrees with the liquid crystal molecules in their homogeneous relaxed state, and substantially perpendicular to the optical axis of the image bar, so that the image bar is non-transmissive when all of the dot shutters are energized, bursts of light for erasing pixels of precharged background area of the photoconductive member being passed by selected dot shutters through the interruption and reapplication of the voltage applied thereto; and a relatively thin prism having a predetermined light deflection angle for light passing therethrough, the prism being positioned between the polarizer and the liquid crystal cell, the deflection angle for light passing through the prism being matched to the deflection angle of the light passing through the liquid crystal molecules in their homeotropic energized state, so that the elliptically polarized light, which would normally be generated by the incomplete homeotropic state or tilt of the energized liquid crystal molecules without the prism, does not occur, whereby the contrast between the transmissive and non-transmissive state of the image bar is increased and the driving voltage is concurrently reduced.

6. A transient state liquid crystal image bar for producing latent electrostatic images on a moving, precharged photoconductive member of an electrophotographic printer one line of pixels at a time through the selective passage of bursts of polarized light along an optical axis that is normal thereto, comprising:

a nematic liquid crystal cell configured as a single array of dot shutters individually energizable by the selective application of a single frequency driving voltage, the nematic liquid crystal material contained therein being of the type having its molecules in the homogeneous orientation when in the non-energized or relaxed state;

a polarizer and an analyzer being parallel to each other and having their polarizing axes approximately crossed, the polarizing axis of the polarizer being at 45 degrees with the liquid crystal molecules in their homogeneous relaxed state, and substantially perpendicular to the optical axis of the image bar, so that the image bar is non-transmissive when all of the dot shutters are energized, bursts of light for erasing pixels of precharged background area of the photoconductive member being passed by selected dot shutters through the interruption and reapplication of the voltage applied thereto;

a quarter-wave plate being positioned between the liquid crystal cell and the analyzer, one of the main axes of the quarter-wave plate being aligned with the polarizing axis of the polarizer, so that the linearly polarized light entering the liquid crystal cell exits therefrom as effectively linearly polarized light having been rotated about the optical axis of the image bar by a predetermined angle $\Phi$; and said analyzer being rotatably adjusted about said optical axis and relative to the polarizer and quarter-wave plate by an amount equal to said predetermined angle $\Phi$, so that the effectively linearly polarized light exiting from the quarter-wave plate is coincident with the polarizing axis of the analyzer, whereby the contrast between the transmissive and non-transmissive state of the image bar is increased and the driving voltage is concurrently reduced.

* * * * *